Nov. 19, 1968

T. HEHENKAMP 3,412,315

LOAD RESPONSIVE CONVERTER

Filed June 28, 1966

INVENTOR.
THEODORUS HEHENKAMP
BY

United States Patent Office 3,412,315
Patented Nov. 19, 1968

3,412,315
LOAD RESPONSIVE CONVERTER
Theodorus Hehenkamp, Emmasingel, Eindhoven, Netherlands, assignor to North American Philips Company, Inc., New York, N.Y., a corporation of Delaware
Filed June 28, 1966, Ser. No. 561,142
Claims priority, application Netherlands, July 24, 1965, 6509623
3 Claims. (Cl. 321—18)

ABSTRACT OF THE DISCLOSURE

A load responsive converter in which a thyrister in series with a D.C. voltage source is controlled by cyclic voltage variations across a variable load. The cyclic voltage variations are produced by a resonant circuit connected to the thyrister and are coupled to the load through a capacitor which advances the phase of the controlling load voltage in response to an increase in the load.

---

This invention relates to direct current-alternating current converters comprising at least one controlled rectifier and an oscillatory circuit for operating the rectifier. The circuit is coupled to a substantially ohmic load and thus damped undercritically. Periodically the oscillatory circuit is excited through the recifier by a direct-voltage source in response to control pulses derived from a generator circuit stimulated by the oscillatory voltage produced by the converter, said generator circuit being connected in parallel with the load.

The term "oscillatory circuit damped undercritically" has to be understood herein to mean an oscillatory circuit in which the current flowing through the connecting wires, upon connection to a direct-current source, initially increases, then decreases, becomes zero, and finally tends to reverse its direction.

The generator circuit may be connected in parallel with the load either, directly or through a transformer.

A known converter of the specified kind has the disadvantage that the voltage of the converter greatly decreases when a load is switched in. This is due to the fact that the voltage across the controlled rectifier at the instant at which it is triggered into conduction is reduced when the converter is loaded. Consequently when the converter is loaded the controlled rectifier passes only a small current pulse instead of the large current pulse necessary.

An object of the invention is to obviate or at least mitigate this disadvantage. A DC-AC converter according to the invention is characterized in that an auxiliary capacitor is connected in series with the load and also connected in series with the circuit of the generator.

When a load is switched in the proportional increase in capacitive reactance causes the voltage across the load and hence the voltage across the circuit of the generator to lead with respect to the voltage of the converter at the supply side of the auxiliary capacitor so that the control pulses are given off sooner. It may thus be ensured, that in case the converter is loaded the voltage across the controlled rectifier at the instant of triggering, is larger than the corresponding voltage in the device of FIG. 1.

The load preferably comprises at least two partial loads which may be switched separately. Without the use of the invention, the voltage across the controlled rectifier at the instant of triggering is lower at the higher load than at the smaller load. Consequently the controlled rectifier passes a current pulse which, is smaller at the higher load than at the smaller load. However, in the former case a larger current pulse is needed. The use of the invention provides such a large current pulse, since in response to an increasing load the voltage across the generator circuit will also lead to an increasing extent with respect to the voltage of the converter at the supply side of the auxiliary capacitor. The control pulses are thereby produced earlier. The duration of the period is thus shortened. Now again the desired greater supply of energy to the load becomes possible.

The impedance of the auxiliary capacitor at the frequency of the converter for maximum load is preferably no greater than the resistance of this load and more particularly is less than two thirds of this resistance. For higher values of the impedance of the auxiliary capacitor, the influence of this capacitor on the frequency of the converter becomes too large.

In order that the invention may readily be carried into effect, it will now be described, in detail, by way of example, with reference to the accompanying drawing, in which.

Figure 1:
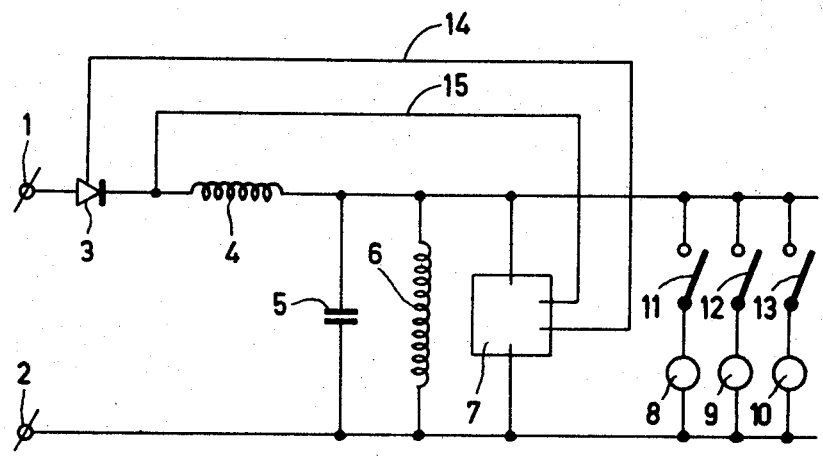
FIG. 1 shows a converter with a load without the use of the invention.

In FIG. 1 connecting terminals 1 and 2 of a direct-current source of, for example 100 volts are bridged by the series-combination of a thyristor 3, an inductor 4 and a capacitor 5. Connected in parallel with capacitor 5 are a further inductor 6, a control pulse generator 7, and a load 8, 9 and 10 in series with switches 11, 12 and 13 respectively. The load 8, 9 and 10 is constituted, for example, by incandescent lamps. Pulses are applied from the control pulse generator 7 through connections 14 and 15 to the thyristor 3.

During the period of conduction of the thyristor 3, the oscillation of the oscillatory circuit 4, 5, 6 is damped undercritically by the load. During the cut-off condition of the thyristor 3, the oscillation of the circuit 5, 6 is damped by the load.

Figure 3:
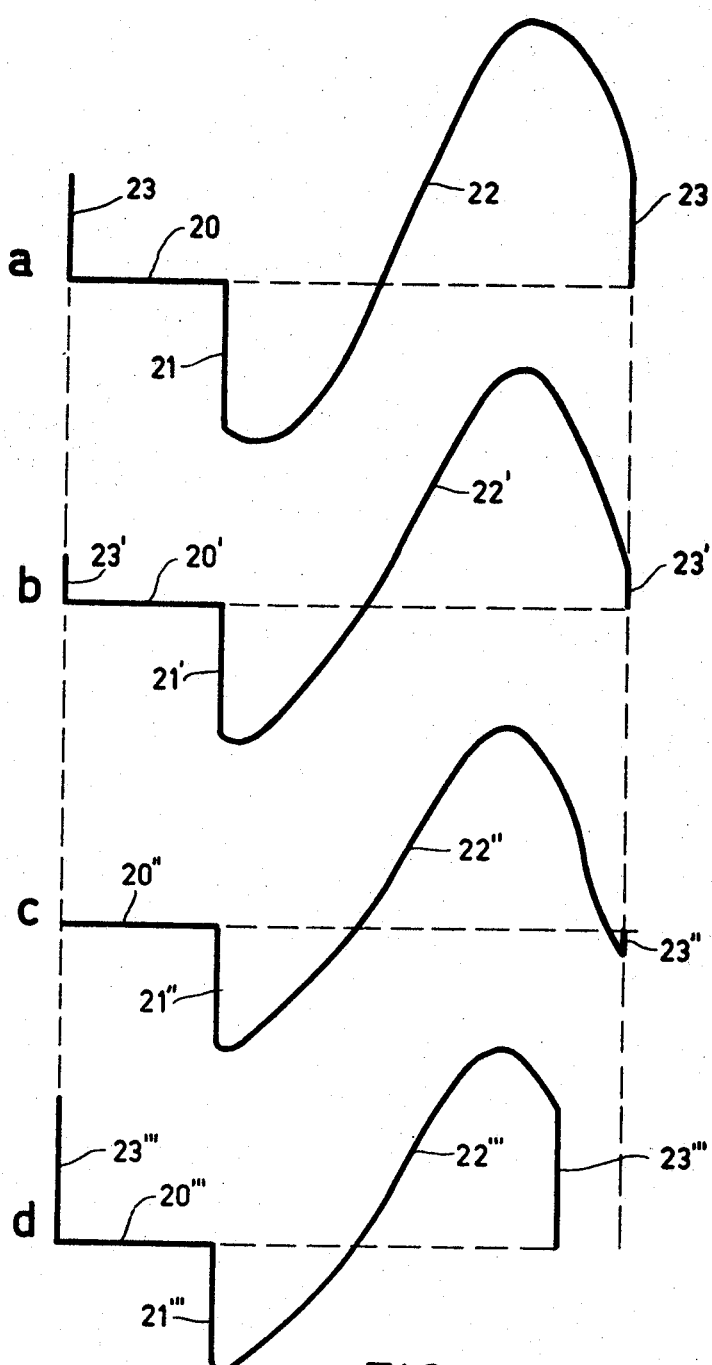
FIG. 3a shows, as a function of time, the variation of the voltage across the controlled rectifier of the converter of FIG. 1, in the case of a small load.
FIG. 3b shows, as a function of time, the variation of the voltage across the controlled rectifier of the converter of FIG. 1 at a higher load.
FIG. 3c shows, as a function of time, the variation of the voltage across the controlled rectifier of the converter of FIG. 1 at maximum load.
FIG. 3d, shows, as a function of time, the variation of the voltage across the controlled rectifier of a converter according to the invention (FIG. 2) at maximum load.

The voltage across the thyristor 3 of FIG. 1 is shown diagrammatically as a function of time in FIG. 3a in the case where switch 11 only is closed. The load therefore consists of the lamp 8. In FIG. 3 the voltage and the time are plotted on the vertical and horizontal axes, respectively.

FIG. 3a is built up of a horizontal part 20 (thyristor conducting), a vertical part 21 (thyristor is switched off), a part 22 and a part 23. The part 22 represents the oscillation of the circuit consisting of capacitor 5 and inductor 6 damped by the load 8. The vertical part 23 occurs at the instant when the thyristor 3 is triggered into conduction by a pulse from the generator circuit 7, 14, 15. The distance between the two vertical parts 23 indicates the duration of a period of the voltage produced by the converter.

When the load is increased by closing the switch 12, the voltage-time variation of the voltage across thyristor 3 is represented, for example, by FIG. 3b. The period of conduction 20' of thyristor 3 has little changed relative to that in the previous case. After the thyristor is switched off, the part 21' has a height which is a little less than the part 21 in the case of FIG. 3a. The oscillation 22' is more strongly damped by the higher load than the oscillation 22 of FIG. 3a. The instant of triggering the thyristor 3 is the same as that in FIG. 3a. However, due to the stronger damping, the height of the part 23′ is less than that of the part 23. Thus, in response to increasing loads where a larger current through the thyristor is necessary, the amplitude of the current pulse of the thyristor will decrease.

If the load is increased further by closing the switch 13 the effect referred to will be intensified. It is even possible, as shown in FIGURE 3c, that the control voltage across the thyristor is negative (23″) at the instant when the thyristor must become conducting. A current pulse through the thyristor is then impossible and the voltage of the converter is reduced to zero (that is to say the converter no longer functions).

Figure 2:
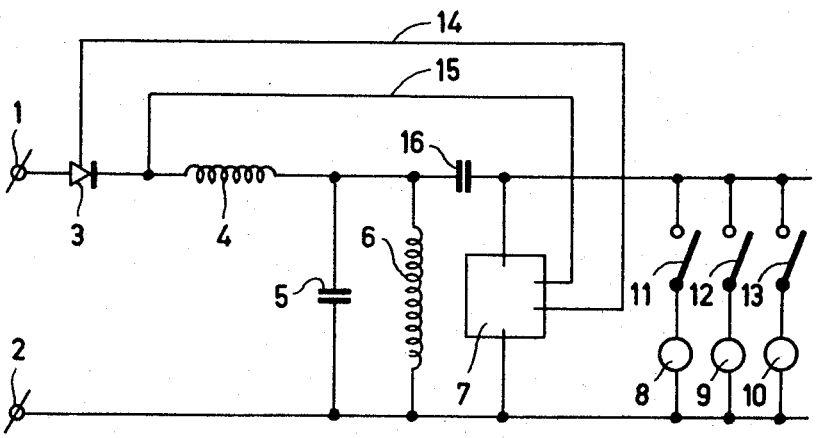
FIG. 2 shows a converter with a load according to the invention.

According to the invention, an auxiliary capacitor 16 is connected in series with the load 8, 9 and 10 and in series with the generator 7 (see FIG. 2). The reference numerals of this figure corresponds to those of FIG. 1. By the introduction of the auxiliary capacitor 16 a phase difference is produced between the voltage across generator 7 and the converter voltage set up across the oscillatory circuit 5, 6, whereby the latter voltage leads the former by an increasing extent as the load increases. Thus, the control pulses applied to the thyristor 3 by the generator circuit 7, 14, 15 are produced earlier, resulting, for example, in a voltage-time diagram of the thyristor 3 as shown in FIG. 3d. FIG. 3d relates to the circuit of FIG. 2 for a load corresponding to FIG. 3c, that is to say a load comprising 8, 9 and 10. Identical parts of FIGURES 3 are indicated by corresponding reference numerals. Owing to the earlier production of control pulses the parts 23, 23′ and 23″ now change to 23‴. This part 23‴ occurs so much earlier that 23‴ is larger than 23 of FIG. 3a. This means that the thyristor current can increase in order to supply the correct power to the higher load (three lamps instead of one lamp). Since the distance between the vertical parts 23‴ is smaller than the distance between the parts 23, the frequency of the converter has thus increased.

In a concrete case the data of the electrical elements were the following:

| | |
|---|---|
| Inductor 4 | 30/μH |
| Inductor 6 | 400/μH |
| Capacitor 5 | 2.2/μF |
| Auxiliary capacitor 16 | 1.1/μF |

Loads 8, 9 and 10, each 110 ohms.

The impedance of capacitor 16 at the frequency of approximately 6200 c./s. was 23Ω, that is to say about 63% of the total resistance of the maximum load 8, 9 and 10.

At the specified values of the elements the voltages set up across the load were as shown in the table below.

The load was varied from no load to full load. The central column of the table relates to the case without the auxiliary capacitor (FIG. 1) and the right-hand column relates to the case where the auxiliary capacitor was used (FIG. 2).

VOLTAGE ACROSS THE LOAD IN VOLTS

| Load | Without auxiliary capacitor | With auxiliary capacitor |
|---|---|---|
| No load | 130 | 130 |
| Load 8 | 88 | 115 |
| Loads 8 and 9 | | 110 |
| Loads 8, 9 and 10 | | 105 |

From this table it appears that, upon change from no load to one load (8), the voltage drop is considerably less with the use of the auxiliary capacitor than without the auxiliary capacitor. If the load is increased still further (the load 8 and 9) and if no auxiliary capacitor is used, the damping of the circuit becomes such that the situation of FIG. 3c is already reached and the converter no longer functions. A load comprising 8 and 9 or 8, 9 and 10, when using the auxiliary capacitor, still provides a very acceptable output voltage.

What is claimed is:

1. A self generating converter comprising input means for a direct current supply, a controlled rectifier having a cathode, an anode and a control electrode, inductance and capacitance elements forming a resonant circuit, means connecting said resonant circuit in series with said input means and said rectifier, a capacitor, a variable load coupled to said resonant circuit through said capacitor, means coupled to said resonant circuit through said capacitor for producing a controlled quantity at the frequency of said resonant circuit, and means for applying said controlled quantity to said control electrode.

2. A self generating converter as claimed in claim 1 wherein the said load comprises two component loads and further comprising means for selectively switching said component loads to said capacitor.

3. A self generating converter as claimed in claim 2 wherein the impedance of said capacitor is less than the effective resistance of one of said component loads.

References Cited

UNITED STATES PATENTS

| | | | |
|---|---|---|---|
| 3,221,241 | 11/1965 | Greenberg et al. | 321—18 XR |
| 3,222,571 | 12/1965 | Timm | 323—22 XR |
| 3,229,226 | 1/1966 | Wilting | 321—44 |
| 3,325,716 | 6/1967 | Gomi | 321—18 X |
| 3,350,624 | 10/1967 | Annunziato et al. | 321—18 |

LEE T. HIX, *Primary Examiner.*

W. M. SHOOP, *Assistant Examiner.*